H. B. STILLMAN.
GLOBE-HOLDER.
No. 172,832. Patented Feb. 1, 1876.
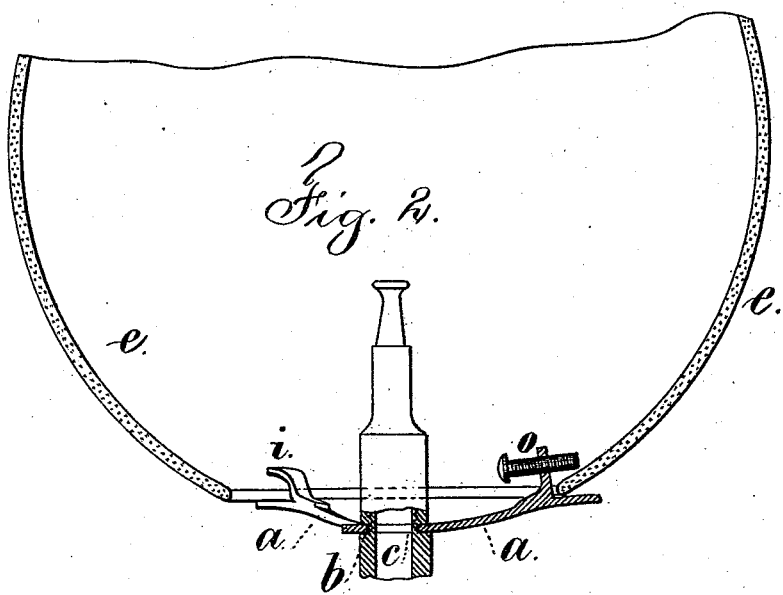
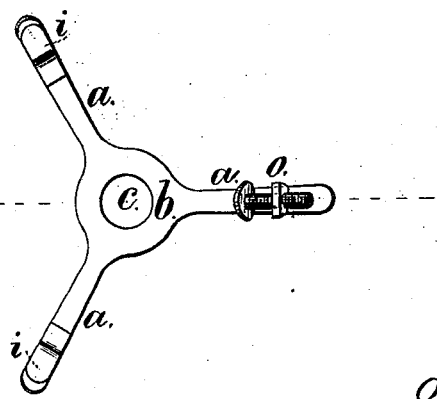

UNITED STATES PATENT OFFICE.

HENRY B. STILLMAN, OF NEW YORK, N. Y.

IMPROVEMENT IN GLOBE-HOLDERS.

Specification forming part of Letters Patent No. 172,832, dated February 1, 1876; application filed July 21, 1875.

*To all whom it may concern:*

Be it known that I, HENRY B. STILLMAN, of the city and State of New York, have invented an Improvement in Globe-Holders for Gas Fixtures, of which the following is a specification:

Globes for gas-fixtures have usually been made with a conical flange at the bottom resting upon a holder with three arms, and external screws passing through bars and forming clamps that hold the said globes in place.

Globes have been made without any flange, and the same have been secured to a circular metal base or flange by a screw-ring; but the same is difficult to apply, and expensive, and obstructs the light.

My invention is made for the purpose of securing a flangeless globe to the arms that project from the gas-burner.

My invention consists in a globe-holder made with three or more arms, upon which the flangeless bottom edge of the globe rests, and provided with outwardly-acting hooks and clamping-screw, whereby the curvature inwardly of the globe at the bottom opening is availed of in holding the globe down to place, instead of the flaring flange now usual. By this construction of globe-holder the cost of the holder is lessened, there is not the shadow usually cast by the flange or ring, and the clamping-screw is out of sight, or nearly so.

In the drawing, Figure 1 is a plan of the globe-holder, and Fig. 2 is a vertical section of the same and a portion of the shade or globe.

The arms *a a a* unite in a central ring, *b*, with a hole, *c*, for the gas-tube to pass through.

The arms are long enough for the lower edge of the globe *e* to rest upon them, and upon these arms are the hooks *i i*, projecting outwardly, and the ear and clamping-screw *o* are also placed within the opening of the globe, and project outwardly, so as to pass above the inward incline of the surface of the globe and clamp the globe in place.

The clamp-screw, being above one of the arms, and coming inside of the globe-opening, can be operated easily by the finger and thumb passing up from below. There is no shadow, except that resulting from the supporting-arms.

In place of the hooks *i*, the arms may be each provided with a screw, so as to adjust the globe to bring the burner exactly at the center.

I claim as my invention—

The globe-holders for gas-fixtures or lamps, made with the clamping-screw and hooks standing outwardly, and with rests upon the surfaces of the arms for the flangeless globe outside such hooks and screw, as specified.

Signed by me this 20th day of July, 1875.

H. B. STILLMAN.

Witnesses:
GEO. T. PINCKNEY,
CHAS. H. SMITH.